United States Patent
Feliciano, Jr.

(10) Patent No.: US 9,090,275 B1
(45) Date of Patent: Jul. 28, 2015

(54) CARRYING DEVICE

(71) Applicant: Angel M. Feliciano, Jr., Homer Glen, IL (US)

(72) Inventor: Angel M. Feliciano, Jr., Homer Glen, IL (US)

( * ) Notice: Subject to any disclaimer, the term of this patent is extended or adjusted under 35 U.S.C. 154(b) by 0 days.

(21) Appl. No.: 13/762,828

(22) Filed: Feb. 8, 2013

(51) Int. Cl.
*A61G 1/02* (2006.01)
*B62B 3/02* (2006.01)
*B62B 1/18* (2006.01)

(52) U.S. Cl.
CPC . *B62B 3/022* (2013.01); *A61G 1/02* (2013.01); *B62B 1/18* (2013.01)

(58) Field of Classification Search
CPC ........... A61G 1/00; A61G 1/013; A61G 1/02; A61G 1/0212; A61G 1/0287; A61G 1/04; A61G 1/048; B62B 5/0083; B62B 5/0086; B62B 5/0093; B62B 3/02; B62B 3/022; B62B 3/04; B62B 2202/42
USPC ........... 280/35, 639, 640, 657, 47.34, 47.371; 5/625, 626, 627, 628, 629
See application file for complete search history.

(56) References Cited

U.S. PATENT DOCUMENTS

| | | | | |
|---|---|---|---|---|
| 2,362,721 A | * | 11/1944 | Reynolds | 5/626 |
| 4,579,381 A | * | 4/1986 | Williams | 296/20 |
| 5,179,746 A | * | 1/1993 | Rogers | 5/625 |
| 5,249,823 A | * | 10/1993 | McCoy et al. | 280/656 |
| 5,572,756 A | * | 11/1996 | Muuranen et al. | 5/626 |
| 6,357,063 B1 | * | 3/2002 | Selby | 5/81.1 R |
| 6,782,976 B2 | * | 8/2004 | Hewitt | 188/29 |
| 6,783,147 B1 | * | 8/2004 | Green, Sr. | 280/652 |
| 7,017,940 B2 | * | 3/2006 | Hatfull | 280/652 |
| 7,150,465 B2 | * | 12/2006 | Darling, III | 280/640 |
| 7,484,594 B1 | | 2/2009 | Feliciano, Jr. et al. | |
| 7,770,913 B2 | * | 8/2010 | Cannon | 280/656 |
| 7,818,840 B2 | * | 10/2010 | Barnett et al. | 5/627 |
| 7,849,961 B1 | | 12/2010 | Feliciano, Jr. et al. | |
| 8,033,553 B1 | | 10/2011 | Feliciano, Jr. et al. | |
| 8,209,803 B2 | * | 7/2012 | Bandel | 5/626 |
| 8,327,481 B2 | * | 12/2012 | Molinaro | 5/625 |

OTHER PUBLICATIONS

A.T. Concepts, Inc., Ladder Lugger Products, Hauler, undated, 1 page.
A.T. Concepts, Inc., Ladder Lugger Products, LLCR, undated, 1 page.
A.T. Concepts, Inc., Ladder Lugger Products, LL1, undated, 1 page.
Photograph of A.T.Conepts, Inc. Ladder Lugger, undated.

* cited by examiner

*Primary Examiner* — John Walters
(74) *Attorney, Agent, or Firm* — Law Office of John W. Harbst

(57) ABSTRACT

A carrying device has an elongate body with a handle toward a first end, a pair of wheels toward a second end, and a moveable end member toward the second end. A latch hooks the moveable member in either an opened or closed position. In one form, a wheel is positioned below the handle at the first end with the elevation of the handle being vertically adjustable. In one form, a flexible carrier is retained over the elongate body and cushions at the ends of the flexible carrier aid in carrying an injured person.

33 Claims, 9 Drawing Sheets

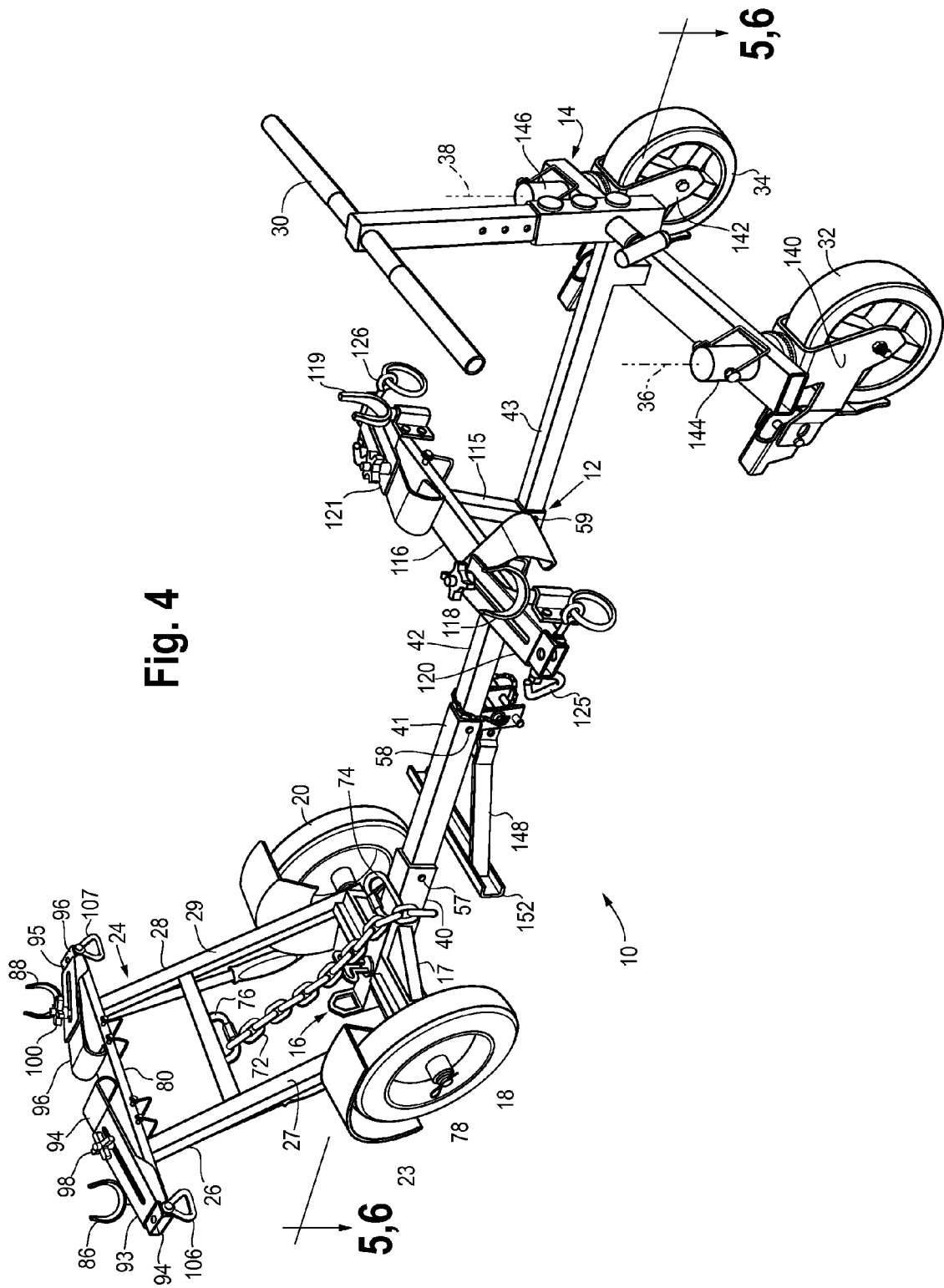

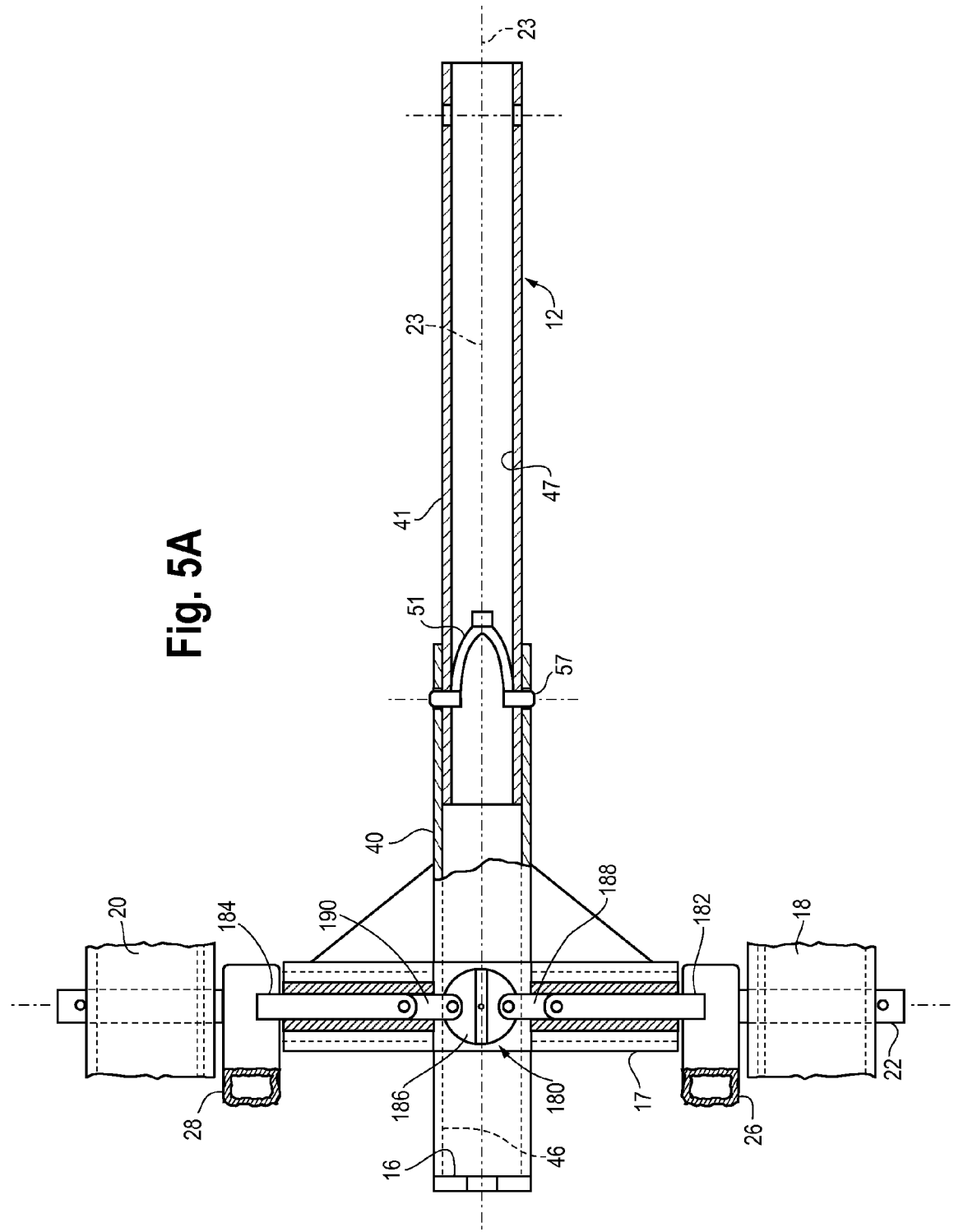

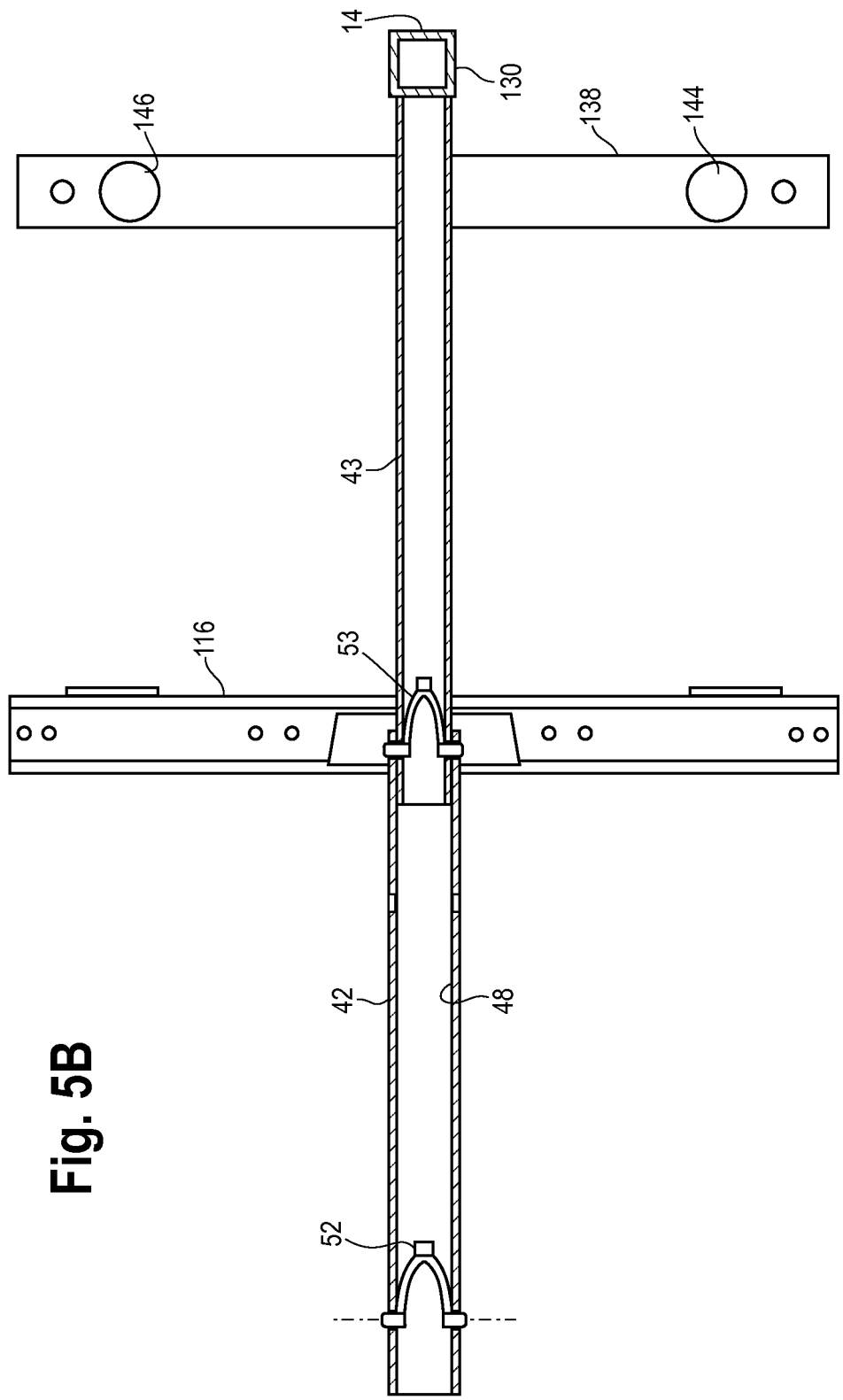

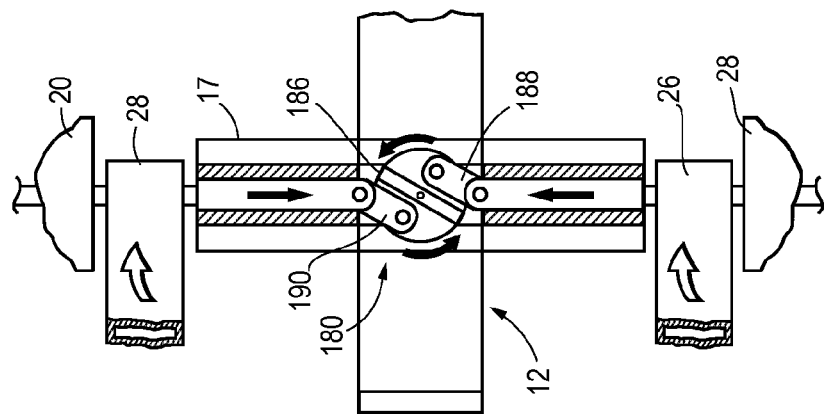
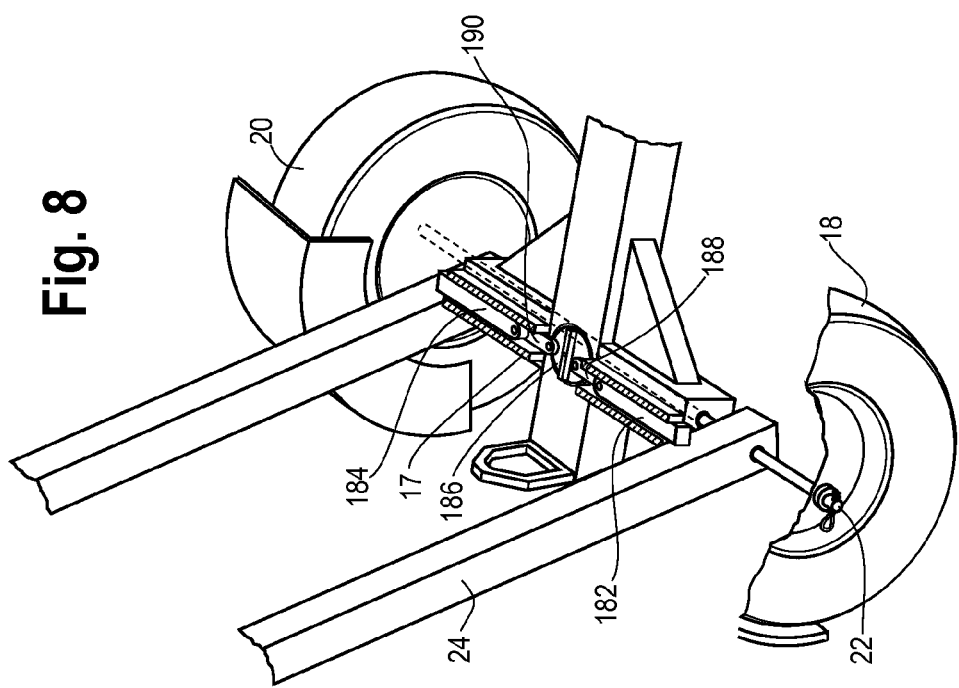

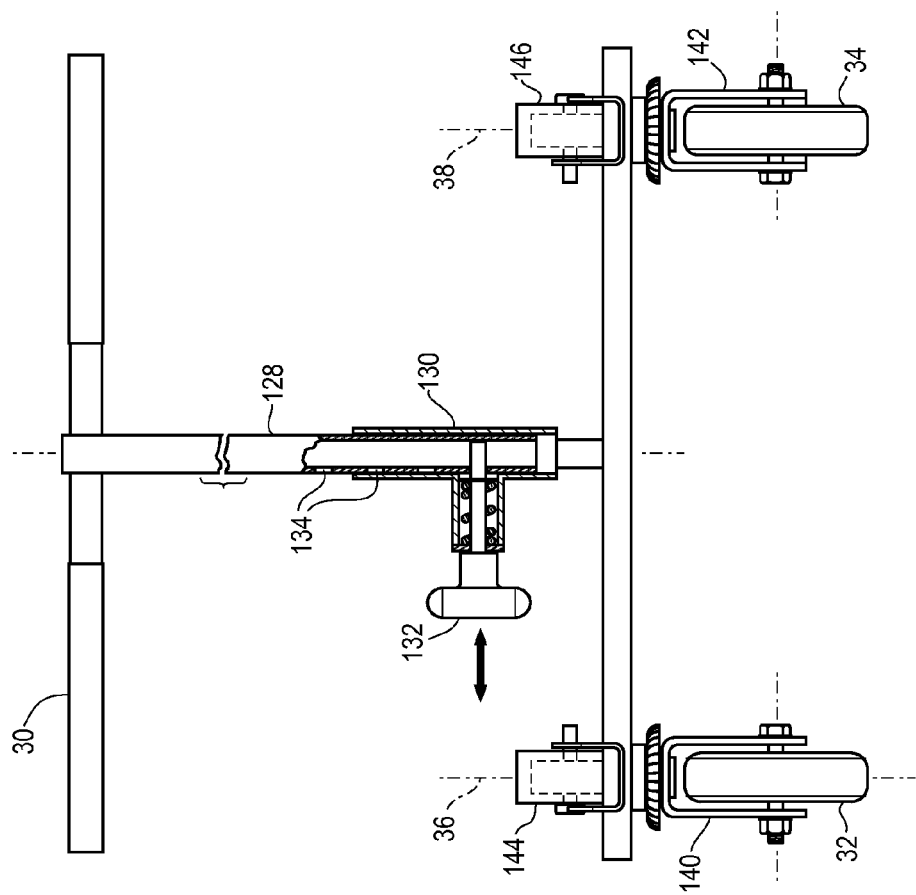
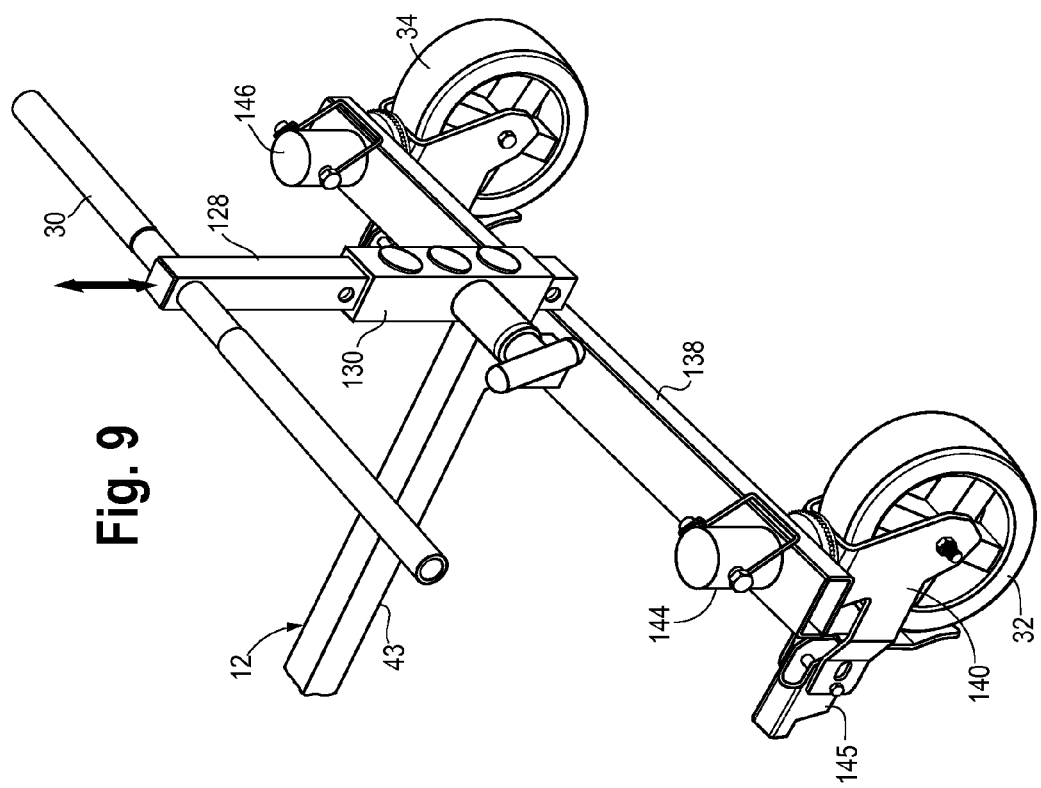

CARRYING DEVICE

The present invention relates to carrying devices for transporting equipment and the like for emergency personnel such as fire and police services.

BACKGROUND OF THE INVENTION

In the event of an emergency such as a fire or serious vehicle accident, emergency personnel are summoned. By the time such emergency personnel arrive at the scene, the surrounding area is often congested by vehicles and equipment from police and fire personnel who arrived earlier to the scene. It is not uncommon for such congestion to prevent a fire truck or other emergency vehicle from approaching any nearer than one block from the scene of a serious emergency. To carry out their tasks properly, the emergency personnel must personally transport certain equipment from the truck to the site of the emergency. Frequently, the equipment to be transported is heavy and awkward and as a result the arrival of such emergency personnel is often delayed by the task of transporting the necessary equipment. Since the equipment is moved by the physical strength of the personnel themselves, transporting the equipment also tires the emergency personnel thereby significantly reducing their effectiveness once they arrive at the scene. The vehicles used for transporting emergency personnel, such as fire trucks and ambulances and the like, contain a very large quantity of equipment, all of which must be transported in the vehicle even though only a small fraction of the equipment may be required at the scene of any one emergency. The cargo compartments of such emergency vehicles are therefore carefully engineered and very limited space is available for any additional device to assist in the transporting of equipment to the scene of an emergency. Nonetheless, fire and ambulance personnel are presently in need of a suitable compact transportation device to assist in the transporting of emergency equipment.

In my previous U.S. Pat. No. 8,033,553 B1 I disclosed a carrying device useable on an emergency vehicle that met many of the needs of emergency personnel. Nonetheless, there is still a need for a carrying device capable of transporting heavier loads and of carrying more diversified types of equipment, or carrying injured people.

SUMMARY OF THE INVENTION

Briefly, the present invention is embodied in a transportation device consisting of an elongate central body having a longitudinal axis, a first end and a second end. The central body has a handle at the first end and a pair of wheels rotatably mounted at the second end for rolling the device across an underlying surface. A moveable end member that defines a plane is positioned at the second end, with the end member pivotable between a first position wherein the plane thereof includes a vector that is perpendicular to the longitudinal axis of the central body and a second position in which the plane thereof is substantially parallel to the longitudinal axis of the central body.

The carrying member further includes a first latch between the central body and the moveable end member wherein the latch will releasably retain the end member in a first position and a second latch between the central body and the moveable end member wherein the second latch will releasably retain the end member in the second position.

In one embodiment of the invention, the device further includes a removable carrying member suspended between the first end of the central body and an outer end spaced from the central body of the end member while the end member is in the first position. In another embodiment of the invention, a wheel is provided at the first end of the central body below the handle, and the handle is vertically adjustable with respect to the wheel. A lock is provided for selectively locking and unlocking the handle at a desired elevation above the wheel at the first end.

In yet another embodiment of the invention, the wheel at the first end pivots about a vertical axis and includes a lock for releasably locking the at least one wheel against rotation. In yet another embodiment of the invention, a cushion is provided at one of the ends of the carrying member retained between the first end of the central body and the outer end of the moveable end member.

BRIEF DESCRIPTION OF THE DRAWINGS

A better understanding of the invention will be had after a reading of the following detailed description taken in conjunction with the drawings wherein:

FIG. 4 is an isometric view of the device of FIG. 1 with the carrying member removed;

FIG. 5A is a cross-sectional view of a central body of the carrying member of FIG. 3 taken through line 5-5 of FIG. 4;

FIG. 5B is another cross-sectional view of the device of FIG. 1 taken through line 5-5 of FIG. 4;

FIG. 8 is an isometric view of the rearward end of the central body with portions of the wheel broken away to reveal the latching device for latching the end member in either a first position or a second position;

FIG. 8A is a partially cross-sectional view of the latching device shown in FIG. 8 with the latching pins withdrawn;

FIG. 8B is another cross-sectional view of the latching device shown in FIG. 8 with the locking pins extended for retaining the end member in either the first position or the second position;

FIG. 9 is an isometric view of the forward end of the device shown in FIG. 1 showing the wheel assembly and handle; and FIG. 10 is a cross-sectional view of the wheel assembly and handle shown in FIG. 9.

DETAILED DESCRIPTION OF PREFERRED EMBODIMENT

Figure 1:
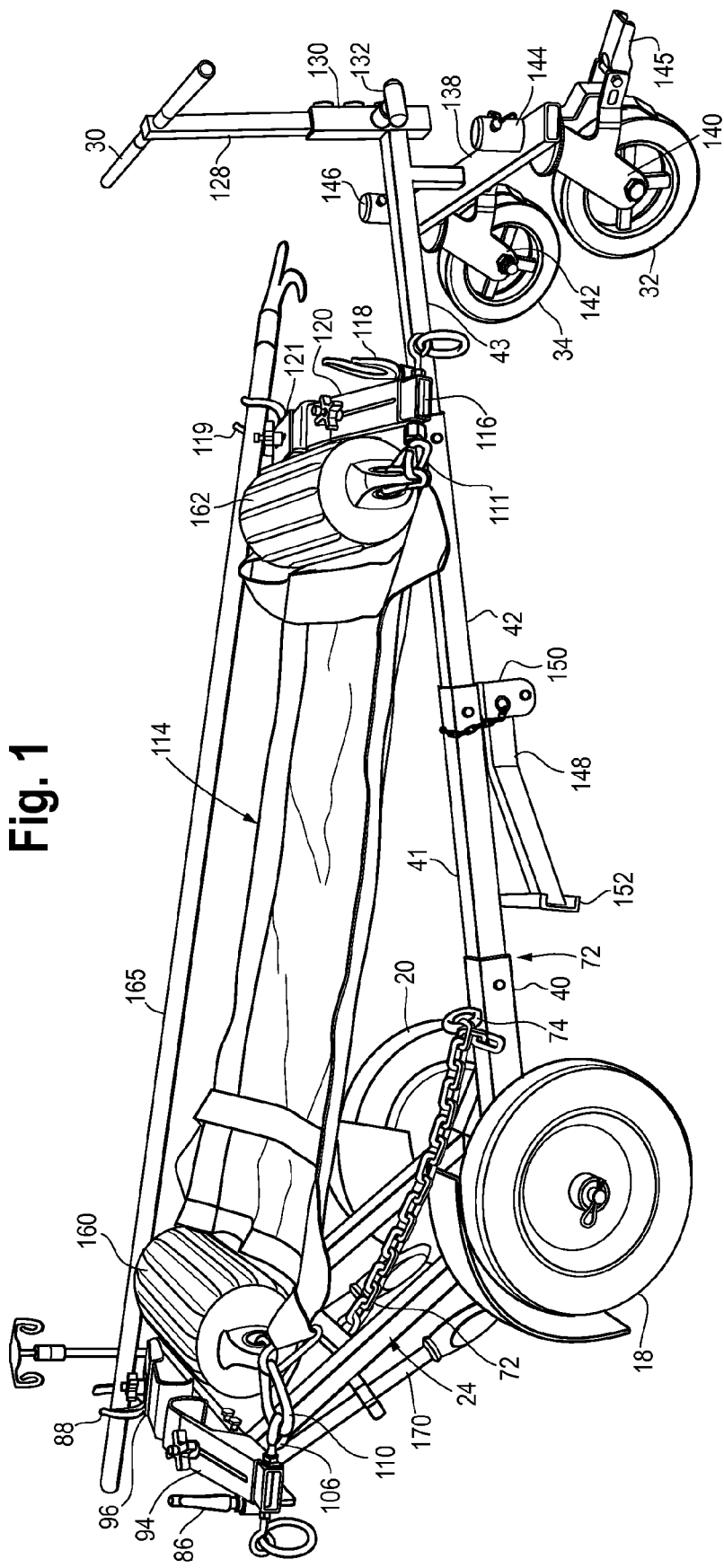
FIG. 1 is an isometric view of the carrying device of the present invention.

Referring to FIGS. 1, 2, 4, 6 and 7, a transportation or carrying device 10 is illustrated for transporting materials to or conveying injured persons from the site of an emergency. In a preferred embodiment, the device 10 includes an elongate telescopically extendable central body 12 having a forward end 14 and a rearward end 16 arranged in longitudinally spaced relation relative to each other. Toward the rearward end 16, at opposite ends of a cross member 17, are opposing spaced apart wheels 18, 20 mounted for rotation about an axle 22 that extends perpendicular to a longitudinal axis 23 of the central body 12. Pivotally mounted for movement around the axle 22 and in a predetermined path of travel is a pivotable end member 24. In one form, the end member 24 is formed from a plurality of transversely spaced apart frame members 26, 28, the upper surfaces 27, 29, respectively, of which defines a plane. Toward the forward end 14 of the central body 12 is a handle 30. In one form, and positioned below the handle 30 are a pair of forward wheels 32, 34 that are moveable about vertical axes 36, 38, respectively, to permit the steering of the device 10 as it moves across underlying ground.

Figure 6:
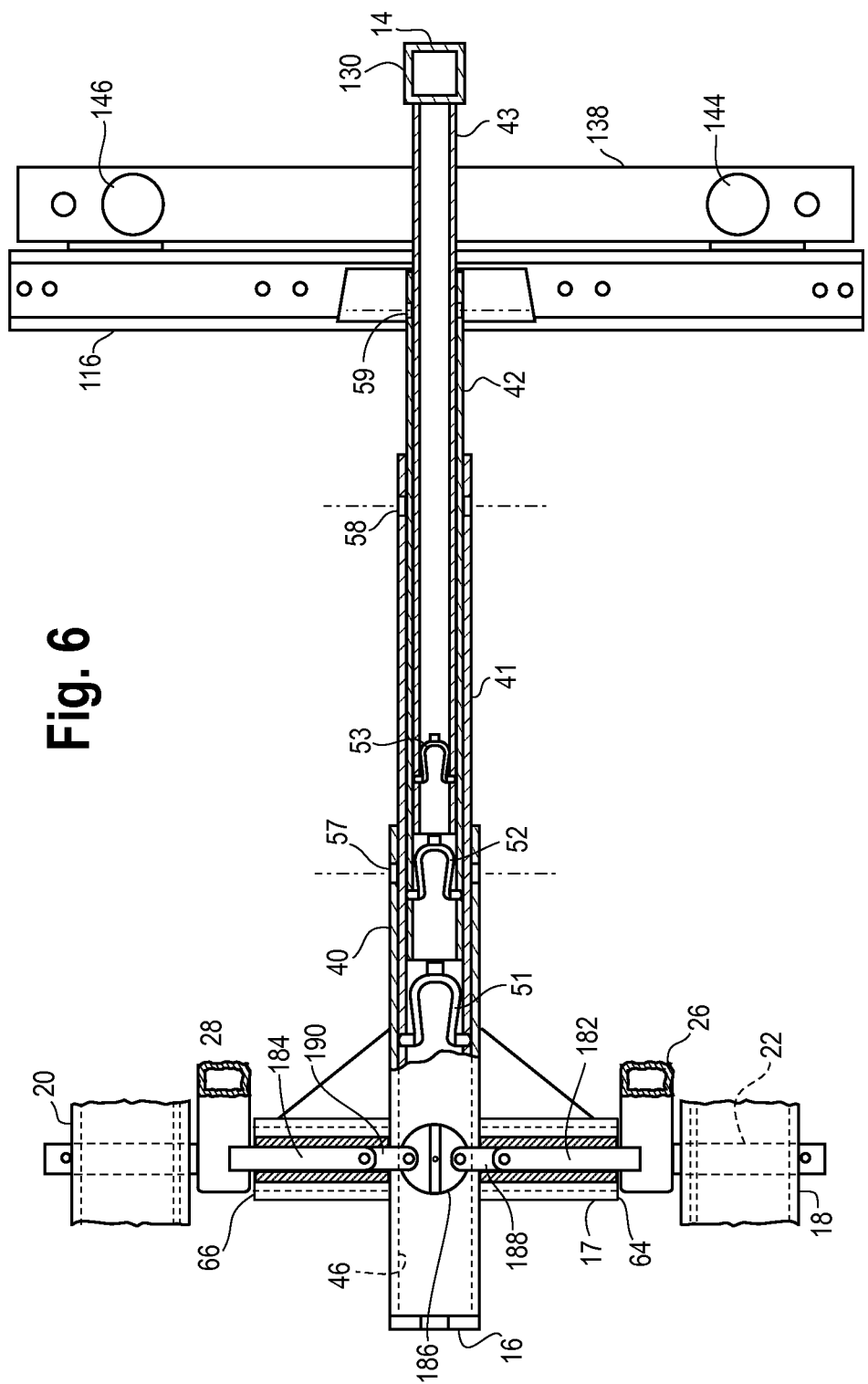
FIG. 6 is a cross-sectional view of the device in FIG. 1 with the central body in the collapsed condition taken through line 6-6 of FIG. 4.

Referring to FIGS. 4, 5A, 5B and 6, the central body 12 is preferably made up of a plurality of tubular nested elongate members 40, 41, 42, 43 all of which are rectangular in cross-section, with the inner opening of the rearward member 40 have a central opening 46 sized to slideably receive therein the second elongate member 41. In similar fashion, the second elongate member 41 has a rectangular central opening 47 sized to slideably receive therein elongate member 42, which in turn has a central opening 48 sized to slideably receive the third elongate member 43 such that the four members 40-43 are telescopically collapsible as best shown in FIGS. 5A, 5B, and 6. Fitted within the rectangular opening within members 41, 42, 43 respectively are spring loaded U-shaped locking members 51, 52, 53 with each of the locking members 51, 52, 53 having opposing outwardly projecting locking pins, unnumbered, sized to be slideably received in opposing transverse holes, some of which 57, 58, 59 are visible for locking the members 40-43 at the elongate central body 12 in either an extended condition shown in FIGS. 1 and 4, or a collapsed condition shown in FIGS. 2 and 7.

Referring to FIGS. 4 and 6, extending perpendicular to the axis 23 of the central body 12 and at the rearward end 16 is the tubular cross member 17 that also has a rectangular cross-section and opposing end plates 64, 66. Extending longitudinally through the length of the cross member 17 and through centrally located holes, unnumbered, in the end plates 64, 66 is the axle 22 on which the wheels 18, 20 are mounted. Pivotally mounted around the axle 22 and between each end plate 64, 66 and its associated wheel 18, 20 respectively are the lower ends of the frame members 26, 28 such that the end member 24 is rotatable about the axle 22 and moveable between a first position, shown in FIGS. 1 and 4 in which the plane of the end member 24 is nearly perpendicular to the axis 23 of the central body 12 to a second position shown in FIG. 7 in which the plane of end member 24 is substantially parallel to the longitudinal axis 23 of the central body 12. A chain 72 has one end connected to a ring 74 at the forward end of the first section 40 of the central body 12 and the opposite end connected to a second ring 76 centrally located on the end member 24 to prevent the end member 24 from moving beyond the second position in which the end member 24 is substantially perpendicular to the central body 12.

Positioned outward of the lower ends of frame members 26 and 28 on the axle 22 are the rear wheels 18, 20 that facilitate the movement of the device 10 across underlying ground. Suitable retaining clips, one of which 78 is visible in several figures, retain each of the wheels 18, 20 to the axle 22.

Figure 3:
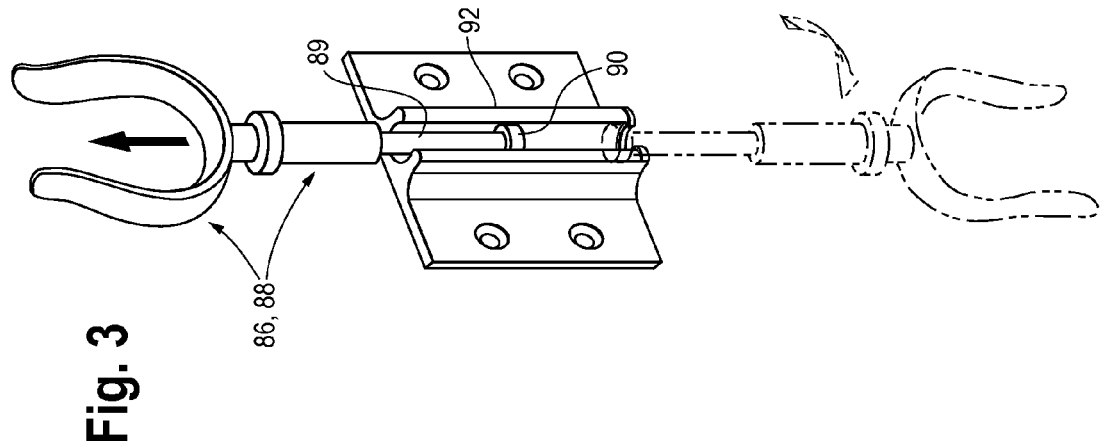
FIG. 3 is an isometric view of a moveable retainer for retaining an elongate member to the device in FIG. 1.
Figure 2:
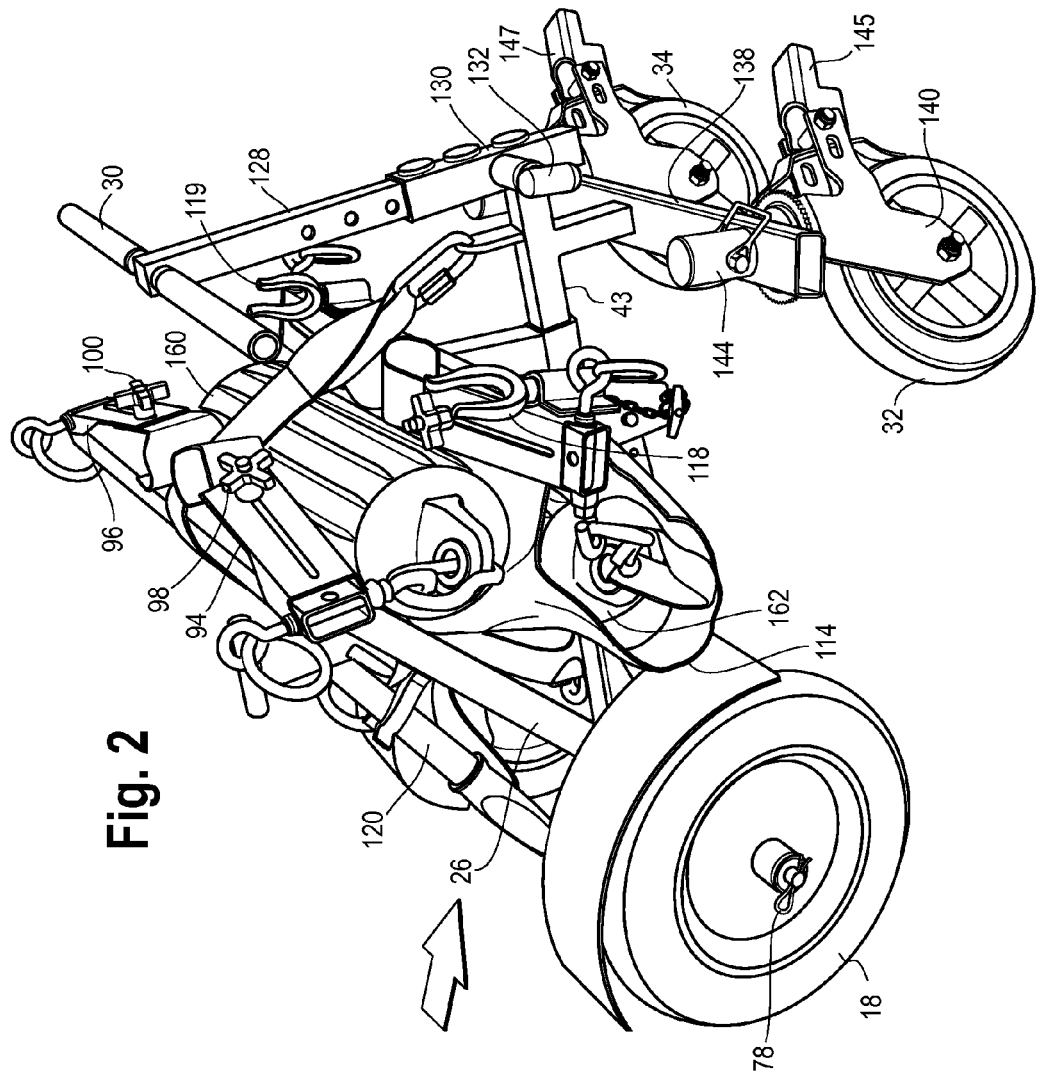
FIG. 2 is an isometric view of the carrying device of FIG. 1 in the collapsed position suitable for transporting on an emergency vehicle.

Referring to FIGS. 1, 3, and 4, at the upper end of the end member 24 is a crossbar 80 oriented perpendicular to the axis 23 of the central body 12 and at the outer ends the crossbar 80 are various retaining elements for retaining objects to the transportation device 10. The retaining elements include moveable U-shaped retainers 86, 88 each of which has a downwardly extending cylindrical shank 89 with an enlarged lower end 90. The shank 89 and enlarged end 90 are receivable in a slotted retainer 92 with the parts configured as a typical rowboat oarlock. The retainers also include adjustable claws 94, 96 at opposite ends of the crossbar 80 with each of the claws 94, 96 having a stationary part 93, 95 hinged to the outer ends of the crossbar 80 and a longitudinally adjustable second portion with the claws 94, 96 at the outer end thereof. The inner and outer portions are retained together by a bolt and wing nut combination 98, 100 that extend through a transverse hole in one of the members and an elongate slot in the other member thereof one set of which is best shown in FIG. 2. Tightening the bolt and wing nut 98, 100 locks the arms 93, 95, 97, 99 of the claws 94, 96 to the desired length for retaining an object to the crossbar 80.

Referring to FIGS. 1 and 4, also positioned near the outer ends of the crossbar 80 are a pair of spaced apart hooks 106, 107 to which other objects such as complementary loops at each corner of a generally rectangular flexible member 114 (two such loops, 110 and 111 are visible in FIG. 1) upon which the body of a person may be suspended for transporting an injured person out of harms way.

Referring to FIGS. 1 and 4, near the forward end 14 of the central body 12, and attached by a short vertically oriented post 115 at the forward end of elongate member 42, is a second crossbar 116 having outer ends with retainers at the outer ends similar to the retainers on the first crossbar 80. Specifically, the retainers on the second crossbar 116 include U-shaped retainers 118, 119, adjustable length claws 120, 121, and hooks 125, 126 that are identical to the U-shaped retainers 86, 87, the adjustable claws 94, 96 and hooks 106, 107 of the first crossbar 80.

As best shown in FIGS. 9 and 10, at the forward most end 14 of the central body 12 is the handle 30 mounted on a vertically adjustable post 128 having a rectangular cross-section. The post 128 is slideable receivable in a tubular generally rectangular sleeve 130 welded to the forward end of elongate member 43 and a removable pin 132 that extends through the sleeve 130 and through one of a series of spaced apart holes 134 in the post 128 to lock the post 128 in a fixed position relative to the sleeve 130 and thereby retain the handle 30 at a desired elevation.

Also at the forward end of the central body 120 is a wheel assembly that includes a lower crossbar 138 with the forward wheels 32, 34 retained in casters 140, 142 with each of the casters pivotable about vertical axes 36, 38 in retainers 144, 146 to enable an operator pushing or pulling on the handle 30 to steer the device 10. In the preferred embodiment, both the casters 144, 146 have foot operated locks 145, 147 shown in the art such that the forward wheels 32, 34 can be selectively locked or unlocked, thereby preventing the device 10 from rolling on uneven ground when unattended.

Referring again to FIGS. 1 and 4, the device 10 further has a moveable support arm 148 rotatably mounted in a retainer 150 positioned midway along the length of the central body 12 and at the lower end of the support arm 148 is a foot 152 which engages the ground when the support arm 148 is rotated to a vertical position in the retainer 150.

As is apparent in FIG. 1, the device 10 can be used to carry a number of tools and equipment from a truck to the scene of an emergency. In the embodiment depicted in FIG. 1, removable cushions 160, 162 are provided near the rearward crossbar 80 and the forward crossbar 116 for providing comfort to an injured person suspended on the flexible member 114. The cushions and member 114 can be retained together by clips attachable to the various hooks at the ends of the crossbars 80, 116. Similarly, elongate pike poles, one of which 165 is depicted, can be fitted in the U-shaped retainers 86, 87, 118, 119 on the crossbars 80, 116 for delivery to the scene of an emergency.

Figure 7:
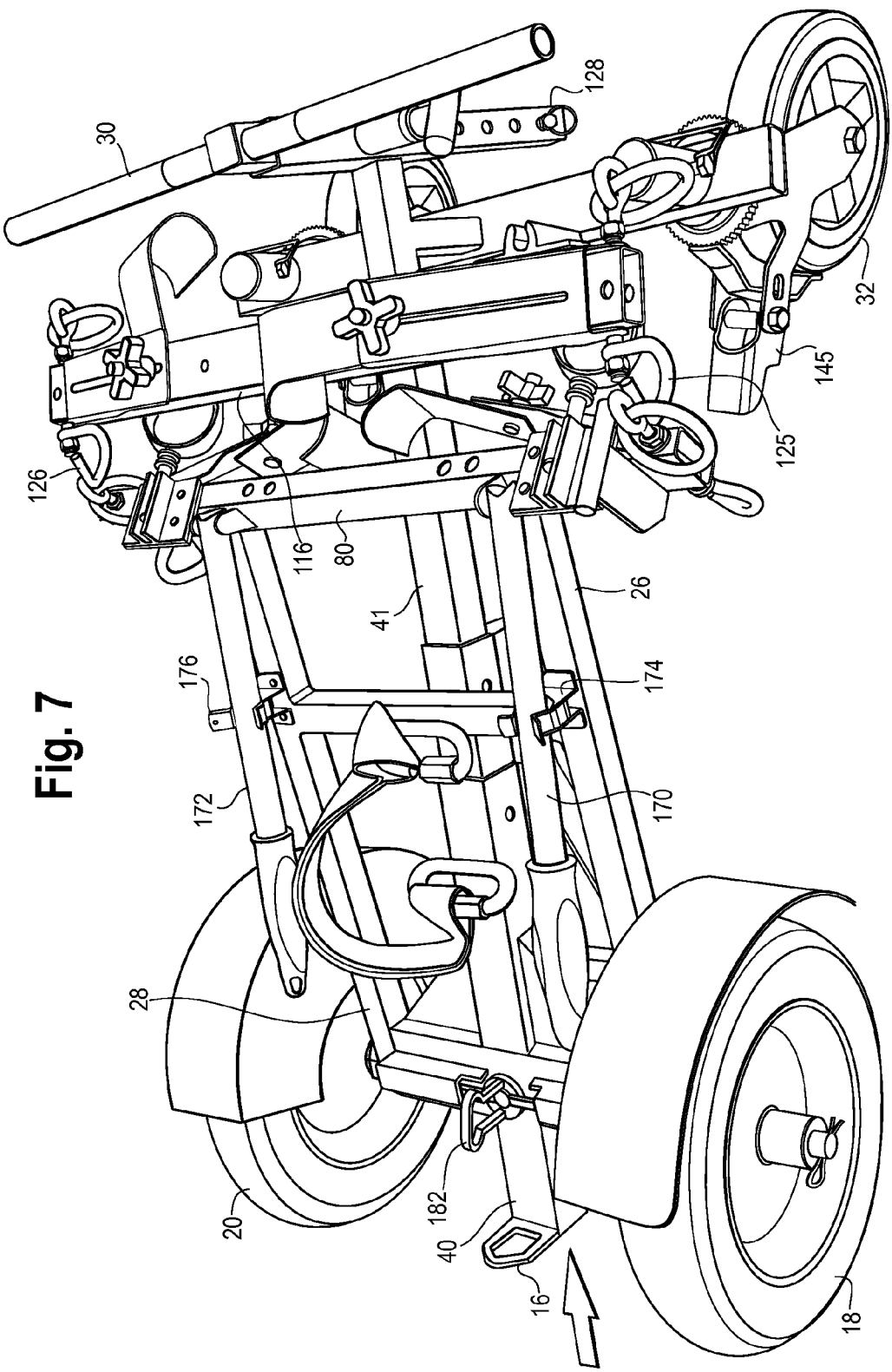
FIG. 7 is an isometric view of the carrying device in FIG. 1 in the partially collapsed condition.

Referring to FIGS. 1 and 7, pivotally attached to the outer ends of the crossbar 80 and extending rearwardly are a pair of moveable handles 170, 172 which are moveable between a closed position foldable against the frame members 26, 28 where they can be retained by clamps 174, 176 to a second extended position, not shown, to enable emergency personnel to maneuver the rearward end of the transporting device 10.

Referring to FIGS. 5A, 8, 8A, and 8B, the device 10 further includes a latch assembly 180 on the upper surface of the cross member 17 for extending or withdrawing outwardly extending latch pins 182, 184. The assembly 180 includes a rotatable member 186 having first and second arms 188, 190 attached thereto with one longitudinally moveable latch pin 182, 184 at the end of each of the arms 188, 190. Preferably, the rotatable member 186 is urged by a spring, not shown, to rotate in the direction causing the latch pins 182, 184 to extend. A removable handle 192 is attachable to the rotatable member 186. As shown in FIG. 8A, rotation of the handle 192 and the latch member 186 in one direction draws the pins 182, 184 towards each other so as not to engage the frame members 26, 28 of the end member 24 and as shown in FIG. 8B, rotation of the latch member 178 in the opposite direction extends the latch pins outward of the end plates 64, 66 to thereby engage the frame members 26, 28. When extended, the latch pins engage one surface of the frame members 26, 28, as depicted in FIG. 8, they retain the end member 24 in its first position generally perpendicular to the central body 12. When the latch pins are released, the end member 24 is foldable to the second position, depicted in FIG. 7 after which the pins are again allowed to extend, as also shown in FIG. 8B, to retain the frame members 26, 28 in their second position in which the plane of the end member 24 is at least partially perpendicular to the axis 23 of the central body 12.

While the present invention is described with respect to a single embodiment, it will be appreciated that many modifications and variations may be made without departing from the spirit and scope of the invention. It is therefore the intent of the appended claim to cover all such modifications and variations that fall within the spirit and scope of the invention.

What is claimed:

1. A carrying device comprising an elongate central body defining an elongated axis and having a first end and a longitudinally spaced second end, a handle arranged toward the first end of said elongate central body,
    a pair of wheels rotatably mounted toward said second end of said central body,
    an end member defining a plane toward said second end of said central body, with said end member being pivotally moveable in a predetermined path of travel between a first position, wherein said plane includes a vector perpendicular to said central body, and a second position in which said plane is substantially parallel to said central body,
    a latch assembly carried toward the second end of said central body and including an actuator operably connected to first and second spring biased latches, with a portion of said first and second latches selectively extending into the predetermined path of said end member so as to releasably retain said end member in either said first position or second position.

2. The carrying device of claim 1 and further comprising a removable carrying member having a first end attachable toward said first end of said central body and a second end attachable toward an outer end of said end member.

3. The carrying device of claim 1 wherein said elongate central body includes a series of tubular nested elongate members arranged in interlocking relationship relative to each other between the first and second ends thereof so as to allow the central body to be telescopically collapsible whereby changing an overall length of said carrying device between an operative position and a storage position.

4. The carrying device of claim 1 further including a movable support positioned between the first and second ends of the elongate central body.

5. The carrying device of claim 1 wherein said end member has a first crossbar arranged toward a free end thereof and extending generally perpendicular to the elongated axis of said central body, with said first crossbar having retaining elements thereon.

6. The carrying device of claim 1 wherein said central body carries a second crossbar extending generally perpendicular to the elongated axis of said central body and arranged in longitudinally spaced relation relative to said first crossbar, with said second crossbar having retaining elements thereon.

7. The carrying device of claim 1 further including handle structure carried by said end member for facilitating maneuvering and movement of said carrying device.

8. A collapsible carrying device movable between a storage position and an operative position, said carrying device comprising
    an elongate central body having a first end and a second end,
    an end member arranged toward the second end of said elongate central body, with said end member being pivotally movable between an upstanding operative position and a storage position,
    a latch assembly for positively maintaining said end member in said operative position or allowing said end member to be moved into said storage position,
    a pair of wheels rotatably mounted at said second end of said elongate central body,
    a handle at said first end of said elongate central body, with said handle including a bar extending generally perpendicular to a length of said elongate central body, and wherein said bar is vertically adjustable, and a lock for locking said bar at a desired vertical adjustment; and
    a carrying member releasably attachable to and supported toward the first end of said elongate central body and releasably attachable to and supported by said end member toward the second end of said elongate central body such that when said end member is in the upstanding operative position and said carrying device is in an operative position said carrying member is arranged in elevated relation relative to said elongate central body.

9. The device of claim 8 further including at least one wheel mounted toward the first end of said elongate central body, and wherein said at least one wheel at said first end includes a lock for releasably locking said at least one wheel against rotation.

10. The carrying device of claim 8 wherein said elongate central body includes a series of tubular nested elongate members arranged in interlocking relationship relative to each other between the first and second ends thereof so as to allow the central body to be telescopically collapsible whereby changing an overall length of said carrying device between said operative position and said storage position.

11. The carrying device of claim 8 further including a movable support positioned between the first and second ends of the elongate central body.

12. The carrying device of claim 8 further including handle structure for facilitating maneuvering and movement of said carrying device.

13. The carrying device of claim 8 wherein said end member has a first crossbar arranged toward a free end thereof and extending generally perpendicular to the elongated axis of said central body, with said first crossbar having retaining elements thereon.

14. The carrying device of claim 13 wherein said central body carries a second crossbar extending generally perpendicular to the elongated axis of said central body and arranged in longitudinally spaced relation relative to said first crossbar, with said second crossbar having retaining elements thereon.

15. A collapsible carrying device movable between a storage position and an operative position, said carrying device comprising
   an elongate central body having a first end and a second end,
   a pair of wheels rotatably mounted at said second end of said elongate central body,
   at least one wheel toward said first end of said elongate central body,
   an end member arranged toward the second end of said elongate central body, with said end member being pivotally movable between an upstanding operative position and a storage position,
   a latch assembly for positively maintaining said end member in said operative position or allowing said end member to be moved into said storage position,
   a handle toward said first end of said elongate central body, wherein said handle includes a bar perpendicular to a length of said elongate central body, with said bar being vertically adjustable with respect to said at least one wheel, and a lock for locking said bar at a desired elevation above said at least one wheel; and
   a carrying member releasably attachable to and supported toward the first end of said elongate central body and releasably attachable to and supported by said end member toward the second end of said elongate body such that when said end member is in the upstanding operative position and said carrying device is in an operative position said carrying member is arranged in elevated relation relative to said elongate central body.

16. The carrying device of claim 15 wherein said at least one wheel pivots about a vertical axis.

17. The carrying device of claim 15 wherein said elongate central body includes a series of tubular nested elongate members arranged in interlocking relationship relative to each other between the first and second ends thereof so as to allow the central body to be telescopically collapsible whereby changing an overall length of said carrying device between said operative position and said storage position.

18. The carrying device of claim 15 further including a movable support positioned between the first and second ends of and below the elongate central body.

19. The carrying device of claim 15 further including handle structure for facilitating maneuvering and movement of said carrying device.

20. The carrying device of claim 15 wherein said end member has a first crossbar arranged toward a free end thereof and extending generally perpendicular to the elongated axis of said central body, with said first crossbar having retaining elements thereon.

21. The carrying device of claim 20 wherein said central body carries a second crossbar extending generally perpendicular to the elongated axis of said central body and arranged in longitudinally spaced relation relative to said first crossbar, with said second crossbar having retaining elements thereon.

22. A carrying device comprising
   an elongate central body defining a longitudinal axis for said carrying device and having a first end longitudinally spaced from a second end,
   a handle at a first end,
   a pair of wheels at said second end,
   an end member defining a plane toward said second end of said central body, with said end member being pivotally moveable in a predetermined path of travel between a first position, wherein said plane includes a vector perpendicular to said central body, and a second position in which said plane is substantially parallel to said central body,
   a latch assembly carried toward the second end of said central body and including an actuator operably connected to first and second spring biased latches, with a portion of said first and second latches selectively extending into the predetermined path of said end member so as to releasably retain said end member in either said first position or second position,
   a removable carrying member having a first end attachable toward said first end of said central body and a second end attachable toward an outer end of end member, and
   a first cushion at said first end of said carrying member and a second cushion at said second end of said carrying member.

23. The carrying device of claim 22 wherein said elongate central body includes a series of tubular nested elongate members arranged in interlocking relationship relative to each other between the first and second ends thereof so as to allow the central body to be telescopically collapsible whereby changing an overall length of said carrying device between an operative position and a storage position.

24. The carrying device of claim 22 further including a movable support positioned between the first and second ends of the elongate central body.

25. The carrying device of claim 22 wherein said end member has a first crossbar arranged toward a free end thereof and extending generally perpendicular to the elongated axis of said central body, with said first crossbar having retaining elements thereon.

26. The carrying device of claim 25 wherein said central body carries a second crossbar extending generally perpendicular to the elongated axis of said central body and arranged in longitudinally spaced relation relative to said first crossbar, with said second crossbar having retaining elements thereon.

27. The carrying device of claim 22 further including handle structure carried by said end member for facilitating maneuvering and movement of said carrying device.

28. A carrying device comprising an elongate central body having a first end and a second end,
   a handle at a first end of said elongate central body,
   a pair of wheels rotatably mounted toward said second end of said elongate central body,
   a moveable end member defining a plane at said second end, said end member being moveable between a first position, wherein said plane includes a vector perpendicular to said central body, and a second position in which said plane is substantially parallel to said central body,
   a first latch between said central body and said end member, wherein said latch will releasably retain said end member in said first position, and
   a second latch between said central body and said end member wherein said second latch will releasably retain said end member in said second position,
   a removable carrying member having a first end attachable toward said first end of said central body and a second end attachable toward an outer end of said end member;

a first cushion toward said first end of said carrying member and a second cushion toward said second end of said carrying member, at least one wheel toward said first end, said at least one wheel being pivotable about a vertical axis, said at least one wheel including a lock for releasably locking said at least one wheel against rotation, said handle including a bar perpendicular to a length of said elongate central body, said bar being vertically adjustable with respect to said at least one wheel, and a lock for locking said bar at a desired elevation above said at least one wheel.

29. The carrying device of claim 28 wherein said elongate central body includes a series of tubular nested elongate members arranged in selectively interlocking relationship relative to each other between the first and second ends thereof so as to allow the central body to be telescopically collapsible whereby changing an overall length of said carrying device between an operative position and a storage position.

30. The carrying device of claim 28 further including a movable support positioned between the first and second ends of the elongate central body.

31. The carrying device of claim 28 wherein said end member has a first crossbar arranged toward a free end thereof and extending generally perpendicular to the elongated axis of said central body, with said first crossbar having retaining elements thereon.

32. The carrying device of claim 31 wherein said central body carries a second crossbar extending generally perpendicular to the elongated axis of said central body and arranged in longitudinally spaced relation relative to said first crossbar, with said second crossbar having retaining elements thereon.

33. The carrying device of claim 28 further including handle structure carried by said end member for facilitating maneuvering and movement of said carrying device.

* * * * *